Sept. 18, 1928.                  1,684,799
F. S. KOCHENDORFER
THREAD ROLLING MACHINE
Filed Aug. 29, 1924          2 Sheets-Sheet 1
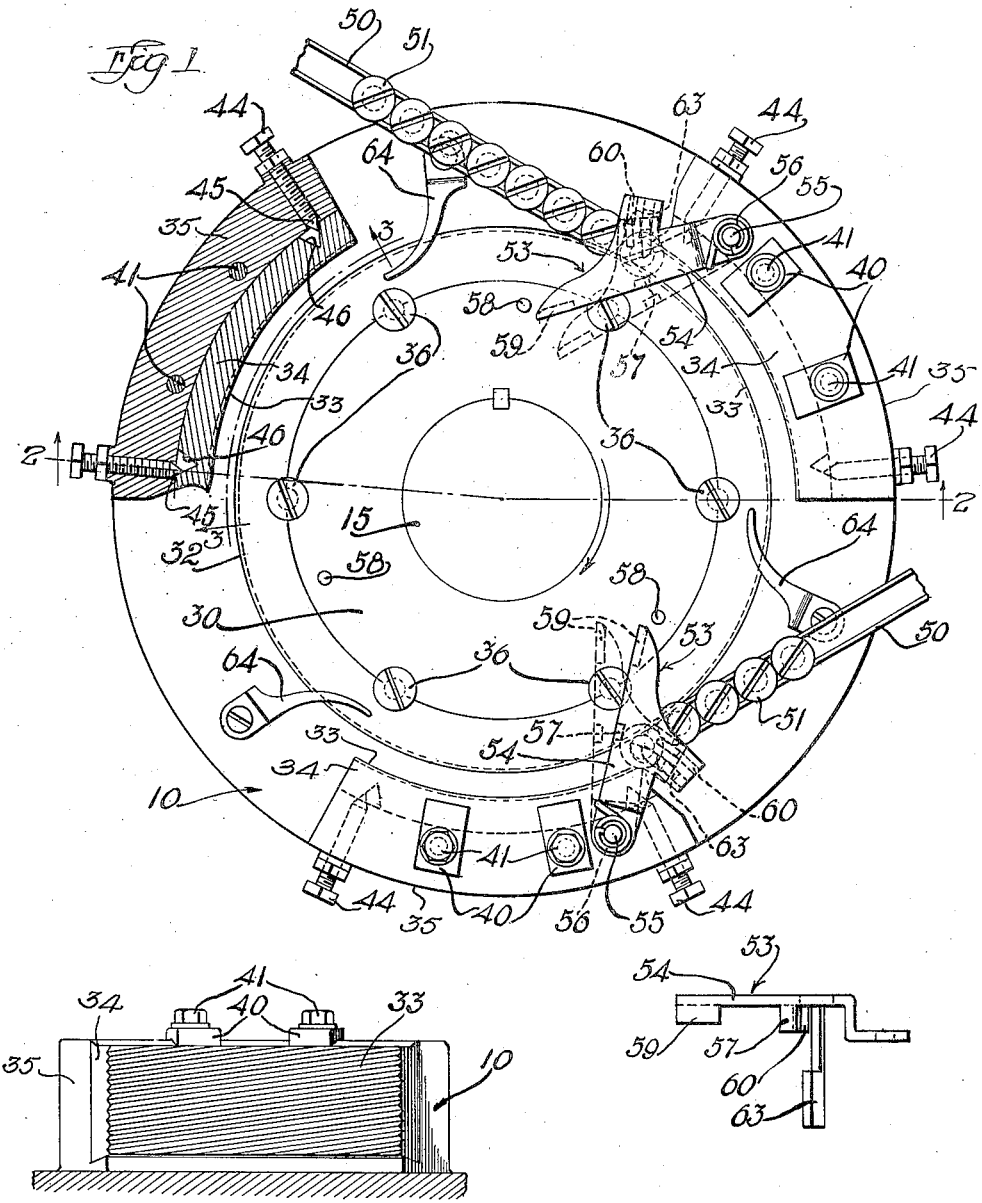
Inventor:
Frederic S. Kochendorfer
By H. A. Pattison Atty.

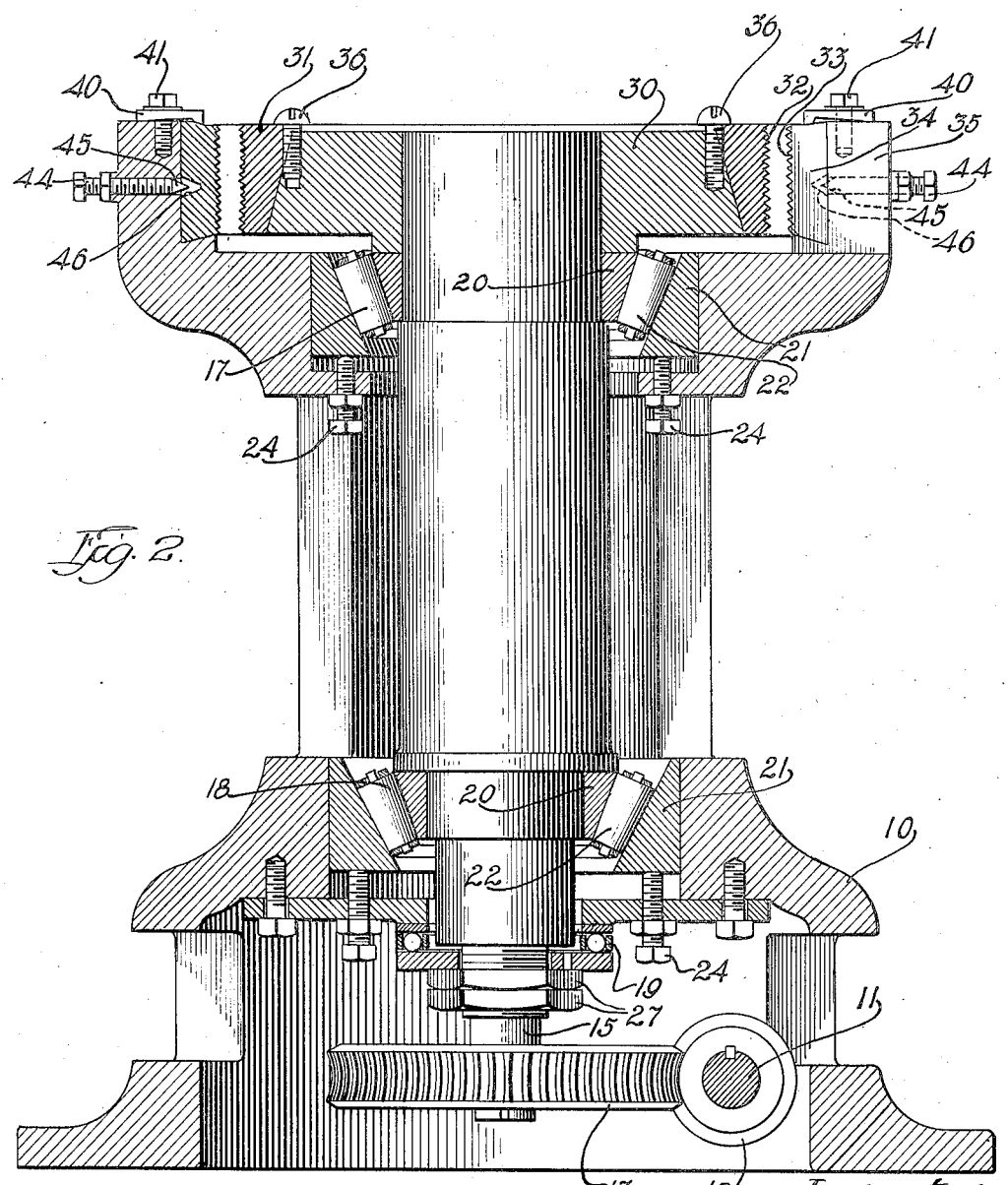

Patented Sept. 18, 1928.

1,684,799

UNITED STATES PATENT OFFICE.

FREDERIC S. KOCHENDORFER, OF RIVER FOREST, ILLINOIS, ASSIGNOR TO WESTERN ELECTRIC COMPANY, INCORPORATED, OF NEW YORK, N. Y., A CORPORATION OF NEW YORK.

THREAD-ROLLING MACHINE.

Application filed August 29, 1924. Serial No. 734,838.

This invention relates to a machine for forming articles, and the primary object of the invention is to provide an improved machine of the character described which will rapidly and accurately form articles from blanks supplied to the machine.

One form of the invention is embodied in a machine for forming screw threads. The machine comprises a plurality of dies, one of which is rotatable and is adapted to co-act simultaneously with each of the other dies to roll the screw threads upon a plurality of blanks which are supplied to the dies by a plurality of feeding devices, the feeding devices being intermittently actuated by pins which are constrained to rotate bodily with the rotatable die around its axis of rotation. Adjustable means is provided for vertically aligning the rotatable die with the other dies, and each of the other dies may be secured in a plurality of angularly adjusted positions with respect to the axis of rotation of the rotatable die.

Other objects and features of the invention will become apparent as the detailed description progresses, reference being had to the accompanying drawings, wherein:

Fig. 1 is a plan view, partly in section, of a machine embodying the invention;

Fig. 2 is a vertical section taken on the line 2—2 of Fig. 1;

Fig. 3 is a section taken on line 3—3 of Fig. 1; and

Fig. 4 is an elevation of a detail part of the machine.

Referring to the drawings, the reference character 10 designates in general the frame of an improved machine for rolling screw threads. The machine comprises a worm shaft 11 rotatably journaled in the frame 10 and driven by any suitable means (not shown). Keyed upon the worm shaft 11 is a worm 12 which meshes with a worm gear 13 rigidly secured upon the lower end of a vertically disposed spindle 15. The spindle 15 is rotatably journaled in the frame 10 by means of a plurality of roller bearings 17 and 18 and a thrust bearing 19. The roller bearings 17 and 18 each comprise an inner race 20, an outer race 21 and a plurality of tapered rollers 22. The outer races 21 are slidably mounted in the frame 10 and may be adjusted by a plurality of bolts 24 threaded into the frame 10. The thrust bearing 19 is disposed intermediate the frame 10 and a plurality of nuts 27 threaded upon the spindle 15. It is obvious that the spindle 15 may be displaced in either direction along its axis of rotation if the bolts 24 and the nuts 27 are properly adjusted and thus compensate for wear.

Referring for the present to Fig. 2, the spindle 15 is provided at its upper end with a frustro-conical head 30 upon which is seated a ring shaped die 31, the ring shaped die 31 being provided with a die surface 32 adapted to co-act with the die surfaces 33 of a plurality of dies 34 mounted in a plurality of brackets 35 which are formed upon the frame 10. The ring shaped die 31 is secured to the head 30 by a plurality of bolts or screws 36 threaded into the head. The dies 34 are equidistantly spaced from each other and from the axis of rotation of the spindle 15. Each die member 34 is slidably journaled in one of the brackets 35 and may be secured in a plurality of adjusted positions by means of clamping members 40 adapted to be drawn against the die by bolts 41.

Threaded into each bracket 35 is a pair of bolts 44 having conical ends 45 adapted to enter similarly shaped depressions 46 formed in the associated die 34 (Fig. 2). The construction is such that the bolts 44 may be employed to angularly adjust the dies 34 with respect to the axis of rotation of the spindle 15. To angularly adjust any one of the dies 34, it is only necessary to withdraw one of its associated bolts 44 a short distance and to advance the other bolt a distance which will bring the die into the desired position. The construction is advantageous in that the dies 34 may be adjusted relative to each other to permit a plurality of screw blanks to be fed simultaneously into the machine so that the die 31 will not be loaded upon a single side for any appreciable length of time.

A plurality of slides 50 are adapted to receive screw blanks 51 from any suitable means (not shown) and to deliver the screw blanks to the dies. A plurality of escapement devices 53 insure that the entry of the screw blanks 51 into the spaces between the dies will be properly timed. Each escapement device 53 comprises a lever 54 which has one of its ends pivotally mounted upon a pin 55 projecting from the frame 10. A coil spring 56 which has one of its ends secured to the pin 55 and the other of its ends secured to the lever 54 is adapted to urge the lever 54 into a position wherein a lug 57 formed upon the lever will engage the foremost screw blank 51 in the associated slide 50. A plurality of pins 58 projecting from the head 30 are adapted to engage a cam plate 59 depending from the free end of the lever 54 and to bring the lever into the position which is illustrated in dotted lines in Fig. 1. When the lever 54 is angularly displaced by one of the pins 58 in the manner described, the foremost screw blank 51 may be advanced into the space between one of the dies 34 and the die 31. A lug 60 formed integral with the lever 54 is adapted to engage the head portion of the following screw blank 51 so that it will not follow the foremost screw blank into the space between the dies.

Depending from the lever 54 is a lug 63 adapted to engage the shank of the foremost screw blank 51 when the lever 54 is angularly displaced and to force the screw blank into the space between the die 34 and the die 31. This insures that each screw blank will be delivered to the dies at the proper instant so that the screw threads on each blank will be properly formed. The die 31 rolls the screw blanks along the dies 34 as the screw threads are being formed. A plurality of ejector blades 64 carried by the frame 10 insure that the completed screws will not adhere to the die 31 after they have been formed.

In the operation of the machine a supply of screw blanks is placed in the means (not shown) which delivers the blanks to the slides 50. The machine is then set in operation. As the die 31 rotates, the pins 58 engage the cam plates 59 and angularly displace the levers 54 so that a plurality of screw blanks are simultaneously fed to the dies, three screw blanks being fed to the dies each time the levers are simultaneously actuated. It is obvious that as three pins 58 are provided, the levers 54 will be simultaneously actuated three times during each revolution of the die 31 so that nine screw blanks will have screw threads rolled upon them during each revolution of the die 31. The completed screws are ejected from the machine by the ejector blades 64.

What is claimed is:

1. In a machine for forming screw threads or the like, a continuous circular die member having a tapered interior wall, a plurality of stationary arcuate dies positioned therearound and co-operating therewith, a shaft, a circular head carried thereby and having a tapered exterior wall for engaging the tapered interior wall of and thereby supporting the circular die, means for rotating the shaft and thereby the circular die, means associated with the stationary dies for feeding blanks between the co-operating dies, and means carried by the circular die and co-operating with the feeding means to continually insure the simultaneous presence of three equi-distantly spaced blanks between the stationary and circular dies thereby relieving the shaft of unequal stresses.

2. In a machine for forming screw threads or the like, a continuous circular die member having a tapered interior wall, three stationary arcuate dies equi-distantly spaced therearound and co-operating therewith, a rotatable shaft, a circular head carried thereby and having a tapered exterior wall for engaging the tapered interior wall of and thereby supporting the circular die, means for rotating the shaft and thereby the circular die, feeding means associated with each of the stationary dies for feeding blanks between the associated stationary die and the rotating die, and means carried by the circular die and co-operating with the feeding means to continually insure the presence of a blank between each of the stationary dies and the rotating dies thereby relieving the shaft of unequal stresses.

3. In a machine for forming screw threads and the like, a continuous circular die member with a tapered interior wall, a rotatable shaft, a circular head carried thereby and having a tapered exterior wall for receiving the tapered interior wall of the circular die member, means for adjusting the position of the circular die member and the head in a direction parallel to the longitudinal axis of the shaft, and a stationary die co-operating with the circular die to roll threads upon a blank positioned therebetween during the rotation of the shaft.

4. In a machine for forming screw threads and the like, a member with a tapered interior wall and an exterior curved die surface, a rotatable shaft, a circular head carried thereby and having a tapered exterior wall for receiving the tapered interior wall of the die member, means for adjusting the position of the die member and the head in a direction parallel to the longitudinal axis of the shaft, a stationary die cooperating with the die member to roll threads upon a blank positioned therebetween during the rotation of the shaft, and means for adjusting the stationary die in a direction at an angle to the adjustment provided for the die member.

In witness whereof, I hereunto subscribe my name this 16th day of August, A. D. 1924.

FREDERIC S. KOCHENDORFER.